United States Patent Office.

WILLIAM A. HALL, OF BELLOWS FALLS, VERMONT.

WATERPROOFING COMPOUND.

SPECIFICATION forming part of Letters Patent No. 609,200, dated August 16, 1898.

Application filed April 5, 1897. Serial No. 630,772. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Waterproofing Compounds; and I do hereby declare the following to be a full, clear, and exact description of the invention, such as will enable others skilled in the art to which it appertains to make and use the same.

This invention relates to improvements in sizing compounds or insoluble coatings for papers, my object being to produce a sizing or coating for paper which shall possess the desirable quality of insolubility, but which at the same time will readily receive the inks or pigments and allow the oil or water vehicles of the dyes and printing compounds to strike through and get a good hold in the fabrics or surface to which it is applied, it being very desirable that these coatings be permeable and yet insoluble to give a good surface for chromolithography and similar work. This quality of the compound which I have invented renders it peculiarly adapted for surfacing the walls of rooms, paper, cloth, leather, and analogous substances which it is desirable should receive an insoluble coating and one which is pervious to but unaffected by water, and yet remains in such condition as to readily take the inks or pigments used in printing and decorative work.

Advertising-signs, and especially those intended for outdoor service, are rendered waterproof by the use of my compound as a coating. The insolubility of the surface protects the paper and prevents its disintegration, and by using an ink having an oil vehicle for the pigment the life of a paper sign is prolonged and the unsatisfactory and expensive method of paraffining the surfaces of these signs after printing is done away with.

In the production of the compound which I have invented I first dissolve the casein or milk albumen in a suitable alkaline solution, and into the solution thus formed I introduce as an additional element a mineral base of some finely-comminuted substance, clay, talc, or infusorial earth serving equally well for this purpose.

I find that a soda alkali will not serve as an ingredient of the composition for the reason that if a soda alkali be used as a solvent for the casein the introduction of the formaldehyde will cause immediate precipitation for the reason that $CH_2O$ has an acid reaction and will not work with a soda alkali. In the use of the other class of alkalies, however— such as ammonia, &c.—as a solvent the objectionable precipitation incident to the use of soda alkali is avoided. In fact, a sufficient quantity of $CH_2O$ can be added to throw the casein solution on an acid, and said solution will still remain perfectly smooth and limpid. The effect of adding this earthy base as an element of the composition is to retard for a short time the setting of the composition and its reaching a perfectly-insoluble state, and it further retards the $CH_2O$ from precipitating the casein from its solution. By thus retarding the action of the composition it can be much more easily handled, and its application as a coating becomes practicable and freed from many difficulties. A further advantage derived from the use of this mineral base is that the earthy element gives the paper coated with the composition a surface that takes ink very readily for the reason that all the pores of the paper do not become closed and obstructed, so as to prevent the absorption of the ink or printing fluid, as is the case when a shellac or wax coating is used to surface the paper.

I add to the solution just described a proportion of methyl alcohol which has been subjected to oxidation after it has been converted into a gaseous product under the formula $CH_2O$. I introduce this gas in any suitable way, by direct mechanical infusion into the casein or milk albumen or by the addition of water charged with the gas to the casein solution. The action of the gas thus introduced into the casein solution in the proper proportions is such as to convert it into an insoluble compound, which retains, nevertheless, its porous and elastic properties; but this state of insolubility, due partly to the retarding action of the mineral base, is not reached for several days—in fact, not until the composition may have been applied and dried out. The effect of the $CH_2O$ infused into the casein mixture or solution is that the compound and materials treated therewith when dried out are insensible to the action of water either at normal or high temperatures. In fact, no perceptible effect is had on the coating when subjected to the action of a mildly alkaline solution. The addition of this gas does not, however, throw the casein out of its solution, which is of course essential when preparing the casein for a coating for paper, &c., to which it is desirable to give an insoluble and waterproof surface.

It is of the utmost importance that the casein be first dissolved in the alkali and the oxidized methyl alcohol ($CH_2O$) added to the solution thus formed, for if the alkali and the $CH_2O$ be mixed and the casein added to the solution thus formed no waterproof action takes place; but by practicing the method outlined herein almost any amount of $CH_2O$ may be added to the casein solution without causing precipitation, and the result is the insoluble waterproof composition described.

While it is important that the compound described above become when dried out quite insoluble and capable of resisting the action of water, yet it is equally important that the coating composed of the elements above recited be prevented from too quickly setting and arriving at a state of complete insolubility. One of the reasons for this is that if the coating become immediately insoluble difficulties in the mechanical application of the compound in finishing papers, &c., would arise, such as the immediate hardening of the composition upon the brushes, implements, and machines by which it is applied to the articles treated. This alone would prevent the commercial success of the invention and interfere with the application of it to the purposes for which it is intended to a great extent.

The composition which I have described above may be made up and applied in a number of different ways in carrying my invention into effect without departing from the spirit thereof.

In the production of my composition as a commercial commodity I preferably dissolve the casein or milk albumen in an alkaline solution and then add the mineral base, (clay or whiting,) which forms about eighty per cent. of the composition and should be worked up in water, and then the casein solution is charged with oxidized methyl alcohol ($CH_2O$) until the mixture has reached the consistency desired. The proportion of $CH_2O$ used is about three and one-half per cent. of a forty-per-cent. solution of $CH_2O$, (oxidized methyl alcohol,) although the proportion of the elements may be varied as desired. The liquid thus formed may be then applied to the article to be coated in any desirable manner, and the color may be varied as desired by the addition of the proper pigments. When dried out, the coating becomes perfectly insoluble, insensible to the action of water, and highly efficient for the purposes for which it is to be used. This condition of insolubility, as hereinbefore stated, is not reached for some time after the application of the coating, this being partly due to the retarding action of the mineral base and to the fact that complete seasoning and consequent oxidation of the elements of the composition must take place before a perfect waterproof condition is reached.

Another method of applying the compound is to spread a coating of the casein or milk-albumen solution, with or without the mineral base, upon the surface to be waterproofed and over the coating thus formed apply an aqueous solution of $CH_2O$, the effect of such treatment being similar to that produced by the first-named method—viz., to produce a coating insoluble and resisting the attacks of moisture.

I have also discovered that where a wall-paint or liquid in which casein or milk albumen is used as a sizing is laid over the surface, allowed to dry out somewhat, and then treated with water charged with oxidized methyl alcohol ($CH_2O$) the results are equally good as those obtained when the several elements of the composition are mixed prior to their application to the surface to be coated.

In lieu of applying the formaldehyde, as above stated in aqueous solution the mineral base—such as talc, clay, &c.—which possesses absorbent qualities, may be treated with the gas, ($CH_2O$.) These substances will absorb the gas in large quantities without becoming wet, and this mineral base so charged with gas can be added to the casein solution and produce similar and equally good results as when the aqueous solution is used. By this union of the elements before described (casein or milk albumen, oxidized methyl alcohol, ($CH_2O$,) and an earthy mineral base) an enamel or coating is produced which gives a superior finish to articles which are treated with the composition and one which while insoluble in water is yet sufficiently porous to leave the paper possessed of those absorbent qualities which are very essential for the reception and retention of writing, printing, or lithographing inks and pigments.

The uses to which the composition may be put are manifold. Wall-surfaces treated with it are protected from the attacking moisture, which is apt to render unsightly and ruin them. Surfaces thus treated are, however, in as good receptive condition for decorative work as before, a condition which it is impossible to preserve with some of the shellac or waxy compositions now in use, these latter destroying the porosity and absorptive qualities of the surface. Leather, paper, and cloth when treated with this sizing are rendered quite waterproof and the fabric protected from the attacks of moisture, while a highly-finished surface is given to them.

Having thus described my invention, I claim and desire to secure by Letters Patent—

1. A composition for giving an insoluble, porous coating to wall-surfaces, paper, &c., composed of a solution of casein or milk albumen, a retarding agent to prevent too rapid setting of the coating and to insure its porosity, and formaldehyde ($CH_2O$).

2. A composition for giving an insoluble, porous coating to wall-surfaces, paper, &c., composed of casein or milk albumen, an alkali, a retarding agent to prevent too rapid setting of the coating and to insure its porosity, and formaldehyde ($CH_2O$).

3. A composition for giving an insoluble, porous coating to wall-surfaces, paper, &c., composed of casein or milk albumen, an alkali, a mineral base to act as a retarding agent and give porosity to the coating, and formaldehyde ($CH_2O$).

4. The method of producing an insoluble composition for coating wall-surfaces, paper, &c., which consists in dissolving casein or milk albumen in an alkali solution, adding a mineral substance to said solution to serve as a base and retarding agent and to give porosity to the coating and then infusing into the compound thus formed formaldehyde ($CH_2O$).

In testimony whereof I affix my signature in presence of two witnesses.

WILLIAM A. HALL.

Witnesses:
PRESTON H. HADLEY,
A. H. CHANDLER.